United States Patent [19]

Yusa et al.

[11] 4,442,262
[45] Apr. 10, 1984

[54] COMPOSITION OF POLYESTER-BLOCK COPOLYMER

[75] Inventors: Haruhiko Yusa; Mitsuru Hoshino; Akira Kurosaki, all of Iwaki; Hironobu Furusawa; Chikara Sugitawa, both of Ohtsu, all of Japan

[73] Assignees: Kureha Kagaku Kogyo Kabushiki Kaisha; Toyo Boseki Kabushiki Kaisha, both of Tokyo, Japan

[21] Appl. No.: 322,152

[22] Filed: Nov. 17, 1981

[30] Foreign Application Priority Data

Nov. 22, 1980 [JP] Japan ................... 55-164909
Nov. 22, 1980 [JP] Japan ................... 55-164910

[51] Int. Cl.$^3$ ................... C08F 8/00; C08L 51/00
[52] U.S. Cl. ................... 525/69; 525/64
[58] Field of Search ................... 525/64, 69

[56] References Cited

U.S. PATENT DOCUMENTS 3,919,353 11/1975 Castelnuovo et al. ............. 260/873
3,968,183 7/1976 Hayashi et al. ................. 525/64
4,034,013 7/1977 Lane ........................... 525/64

FOREIGN PATENT DOCUMENTS 52-3646 1/1977 Japan .
53-252 1/1978 Japan .
55-155047 12/1980 Japan .
1429328 of 0000 United Kingdom .
1344522 of 0000 United Kingdom .
2041946 of 0000 United Kingdom .

Primary Examiner—J. Ziegler

[57] ABSTRACT

Disclosed herein is a composition of a polyester-block copolymer, comprising 5 to 80% by weight of at least one kind of graft-copolymer obtained by graft-copolymerizing 50 to 25 parts by weight of a monomeric mixture predominantly consisting essentially of styrene and methyl methacrylate and containing 0.01 to 3.0% by weight of a cross-linking agent with 50 to 75 parts by weight of a cross-linked elastomeric trunk polymer containing not less than 50% by weight of rubber like segment selected from the group consisting of butadiene unit and $C_4$ to $C_{10}$-alkyl acrylate units, and 0.01 to 3.0% by weight of a cross-linking agent, and 95 to 20% by weight of a polyester-block copolymer, the composition giving shaped articles of favorable superficial appearance even when processed by shape-forming under conditions of mixing and kneading of a relatively low degree.

12 Claims, No Drawings

COMPOSITION OF POLYESTER-BLOCK COPOLYMER

BACKGROUND OF THE INVENTION

Polyester-block copolymer is a thermoplastic elastomer, and since the shaped-articles made of polyester-block copolymer show an appropriate superficial hardness and are excellent in impact strength and tenacity, the copolymer is used for various purposes.

However, due to the low melt-viscosity of polyester-block copolymer in general, in the fields where a high melt-viscosity of the material is demanded, for instance, in the case of shape-forming the material by blow-molding or "profile-extruding", it is frequently difficult to obtain the qualified shaped articles from polyester-block copolymer because of the drawdown of the melt resin. Accordingly, methods for improving the processability of polyester-block copolymer in shape-forming while retaining the inherent favorable properties of the resin, have been hitherto studied. For instance, trials have been carried out for solving the problem by admixing an ABS resin (terpolymer of acrylonitrile, butadiene and styrene) or an MBS resin (terpolymer of methyl methacrylate, butadiene and styrene) with polyester-block copolymer.

Although one of the properties, namely, the processability of polyester-block copolymer is improved by the admixture of ABS- or MBS-resin, on the other hand, an unfavorable phenomenon of the occurrence of roughness on the surface of the shaped articles made of the composition comprising polyester-block copolymer and ABS- or MBS-resin has been recognized. The phenomenon includes undesirable defects of the occurrence of so-called fish-eyes due to the poorly dispersed material in the surface layer of the shaped articles resulting in spoiling the appearance of the shape-formed articles. The occurrence of roughness of the surface of the shape-formed articles is considered to be attributable to the insufficient mixing and kneading of the composition comprising polyester-block copolymer and ABS- or MBS-resin.

In order to improve the insufficient mixing and kneading, reinforcement of the conditions of mixing and kneading and addition of a lubricant are considered, however, the former is apt to lead to deterioration of the material and the latter is in danger of causing bleeding of the lubricant onto the surface of the shape-formed articles.

As a result of enthusiastic studies of the present inventors for the improvement of the foregoing defects in polyester-block copolymers, it has been found that a composition comprising 95 to 20% by weight of polyester-block copolymer and 5 to 80% by weight of at least one graft-copolymer prepared by graft-copolymerizing a monomeric mixture predominantly consisting essentially of styrene and methyl methacrylate and containing 0.01 to 3.0% by weight of a cross-linking agent with a cross-linked elastomeric trunk polymer containing not less than 50% by weight of rubber like segment selected from the group consisting of butadiene unit and $C_4$ to $C_{10}$-alkyl acrylate units and 0.01 to 3.0% by weight of a cross-linking agent is a resin composition showing an improved processability in shape-forming while retaining the desirable properties of the original polyester-block copolymer and giving a smaller degree of surface-roughness under condition of mixing and kneading of a relatively low degree and an improved weather proofness to the shape-formed articles especially when alkylacrylate graft polymer is admixed. The present invention has been completed while being based on the findings.

Accordingly, the main object of the present invention is to provide a composition of polyester-block copolymer excellent in processability for manufacturing shape-formed articles. Another object of the present invention is to provide a composition of polyester-block copolymer which gives shape-formed articles showing smooth surfaces without fish-eyes and the like even under conditions of mixing and kneading of a low degree.

DETAILED DESCRIPTION OF THE INVENTION

The present invention relates to a composition of polyester-block copolymer giving shape-formed articles which are excellent in processability, comprising 95 to 20% by weight of a polyester-block copolymer and 5 to 80% by weight of at least one kind of graft-copolymer prepared by graft-copolymerizing 50 to 25 parts by weight of a monomeric mixture predominantly consisting essentially of styrene and methyl methacrylate and containing 0.01 to 3.0% by weight of a cross-linking agent with 50 to 75 parts by weight of an elastomeric trunk polymer containing more than 50% by weight of rubber like segment selected from the group consisting of butadiene unit and $C_4$ to $C_{10}$-alkyl acrylate units and 0.01 to 3.0% by weight of a cross-linking agent.

The polyester-block copolymer for use in the present invention is a copolymer comprising the hard polyester-segments A and the polymer-segments B of a molecular weight of 400 to 20,000, preferably 600 to 4,000, the melting point of a high polymer consisting solely of the polyester-segment A being higher than 150° C. and the melting point of a high polymer consisting solely of the polymer-segment B being lower than 80° C.

As the polyester-segments A consisting the polyester-block copolymer of the present invention, for instance, polyester prepared from an aromatic dicarboxylic acid such as terephthalic acid, isophthalic acid, 1,5-naphthalenedicarboxylic acid, 2,6-naphthalenedicarboxylic acid, 4,4'-biphenyldicarboxylic acid, bis(4-carboxyphenyl)methane, bis(4-carboxyphenyl)sulfone, etc. and their esters and diols such as ethylene glycol, propylene glycol, tetramethylene glycol, pentamethylene glycol, 2,2-dimethyltrimethylene glycol, hexamethylene glycol, decamethylene glycol, p-xylylene glycol, cyclohexane di-methanol, etc., copolyester prepared from more than two kinds of these dicarboxylic acids, for instance, terephthalic acid and isophthalic acid and one or more than two kinds of these diols, polyester derived from oxycarboxylic acids and esters thereof such as 4-(2-hydroxyethoxy)benzoic acid, 4-hydroxybenzoic acid, polylactone such as poly-pivalolactone, polyether-ester prepared from an aromatic etheric dicarboxylic acid such as 1,2-bis(4,4'-dicarboxyphenoxy)ethane, etc. and the above-mentioned diol and moreover, copolyesters prepared by combining the above-mentioned dicarboxylic acids, hydroxycarboxylic acids with diols are exemplified.

On the other hand, as the polymer segments B, for instance, polyalkylene ether glycol such as poly(ethylene oxide) glycol, poly(propylene oxide)glycol, poly(tetramethylene oxide) glycol and mixtures thereof, further the copolymerized polyether glycol prepared by copolymerizing the above-mentioned component of polyether glycol, polyesters prepared from aliphatic dicarboxylic acid of 2 to 12 carbon atoms and aliphatic glycol of 2 to 10 carbon atoms such as polyethylene adipate, polytetramethylene adipate, polyethylene sebacate, polyneopentyl sebacate, polyhexamethylene azelate and poly-ε-caprolactone and copolymers of polyester with the above-mentioned polyether are exemplified. The percentage of the polymer-segment B in the polyester-block copolymer is, preferably, 5 to 80% by weight and more preferably, 20 to 50% by weight. These polyester-block copolymers are produced according to the conventional method.

The cross-linked elastomeric trunk polymer for use in preparing graft-copolymer of the present invention contains not less than 50% by weight of rubber like segment selected from the group consisting of butadiene unit and $C_4$ to $C_{10}$-alkyl acrylate units and 0.01 to 3.0% by weight of a cross-linking agent. The rubber-like properties of the thus prepared graft-copolymer is exhibited only in the case of using not less than 50% by weight of the butadiene, the graft copolymer containing less than 50% by weight of the butadiene being undesirable because of the poor pliability of the composition of polyester-block copolymer prepared by using the graft-copolymer. As the monomer which is copolymerized with the butadiene in an amount of less than 50% by weight, aromatic vinyl monomers such as styrene, alpha-methylstyrene and the like, alkyl methacrylates such as methyl methacrylate, ethyl methacrylate and the like, unsaturated aliphatic nitriles such as acrylonitrile, methacrylonitrile and the like are mentioned.

On the other hand, as the cross-linked elastomeric trunk polymer for use in preparing graft-copolymer of the present invention, homopolymer of a $C_4$ to $C_{10}$-alkyl acrylate or copolymer containing not less than 50% by weight of the alkyl acrylate is utilized, particularly, butyl acrylate, octyl acrylate and the like. The rubber-like properties of the thus prepared graft-copolymer is exhibited only in the case of using not less than 50% by weight of the alkyl acrylate, the graft copolymer containing less than 50% by weight of the alkyl acrylate being undesirable because of the poor pliability of the composition of polyester-block copolymer prepared by using the graft-copolymer. As the monomer which is copolymerized with the alkyl acrylate in an amount of less than 50% by weight, aromatic vinyl monomers such as styrene, alpha-methylstyrene and the like, alkyl methacrylates such as methyl methacrylate, ethyl methacrylate and the like, unsaturated aliphatic nitriles such as acrylonitrile, methacrylonitrile and the like, and diene compounds such as butadiene, chloroprene and the like are mentioned.

As the monomer for forming the graft component, a monomeric mixture predominantly composed of styrene and methyl methacrylate and containing 0.01 to 3.0% by weight of a cross-linking agent is used. The amounts of styrene and methyl methacrylate are 10 to 90% by weight, respectively. As the minor component, monomers copolymerizable with styrene and methyl methacrylate, for instance, alpha-methylstyrene, alkyl methacrylates such as ethyl methacrylate, butyl methacrylate and the like, unsaturated aliphatic nitriles such as acrylonitrile, methacrylonitrile and the like, and vinyl halides such as vinyl chloride and vinyl bromide are mentioned.

As the cross-linking agent for use in cross-linking the trunk polymer and grafting component, those which copolymerize smoothly with the monomer in the respective stages of reaction should be selected. As the representative cross-linking agent, aromatic polyfunctional vinyl compounds such as divinylbenzene, divinyltoluene and the like, di- and trimethacrylates and di- and triacrylates of polyols represented by monoethylene-, diethylene- and triethylene glycols, 1,3-butanediol and glycerin allyl esters of unsaturated aliphatic carboxylic acid such as allyl acrylate, allyl methacrylate and the like and di- and triallyl compounds such as diallyl phthalate, diallyl sebacate, triallyltriazine and the like are mentioned.

As the results of using one of the cross-linking agent in an amount of 0.01 to 3.0% by weight of the monomeric mixture in graft-copolymerization, a tight-knit graft-copolymer is obtained, in which both the trunk polymer and the grafting component are respectively cross-linked themselves, and the trunk polymers are cross-linked to the grafting components.

Accordingly, such graft copolymer is desirably dispersible throughout the polyester-block copolymer, and even under the conditions of lower degree of mixing and kneading, the graft copolymer is uniformly mixed with the polyester-block copolymer giving the shaped articles with their surface showing conspicuously reduced roughness due to fish-eyes. In the case of using less than 0.01% by weight of the cross-linking agent, it is impossible to improve the dispersibility of the graft copolymer into the polyester-block copolymer, and on the other hand, the addition of more than 3.0% by weight of the agent does not result in the proportional improvement of the dispersibility, the addition of more than 5.0% by weight of the agent causing the reduction of the dispersibility of the graft-copolymer.

The monomeric components used in the graft copolymerization may be brought into reaction in one step, or in multiple steps while supplying them in portions of suitable ratio of the present invention between the components.

The graft-copolymer for use in the present invention is prepared by the conventional method of emulsion polymerization, however, in an alternative method, graft copolymerization may be carried out after suitably coagulating the latex of cross-linked trunk polymer for adjusting the size of the latex particles of the trunk polymer.

As has been stated, the weight ratio of the trunk polymer to the grafted component is (50 to 75)/(50 to 25), and in the case where the ratio is larger than the range, the dispersibility of the graft-copolymer into the polyester-block copolymer is poor, and on the other hand, in the case where the ratio is smaller, the pliability of the composition is poor, namely, in both cases, it is impossible to obtain the shaped articles with high quality.

The weight ratio of graft copolymer to polyester-block copolymer is (5 to 80)/(95 to 20), preferably, (5 to 60)/(95 to 40). In the case where the ratio is smaller than the range, the effect of improvement of the properties of the composition is poor, and on the other hand, in the case where the ratio is larger than the range, the thermal stability and processability, of the shape-formed articles made of the composition are undesirable.

The graft-copolymer for use in the present invention may be one kind and may be a mixture of more than two kinds.

As the method for blending the polyester-block copolymer and the graft copolymer, a method of melt-mixing and kneading while utilizing mixers provided with one axis or with two axes, mixing rolls, Banbury mixers, and a method consisting of dissolving the component in solvents, mixing the solutions and removing the solvent are mentioned.

In addition, antioxidant(s), plasticizer(s), pigment(s) filler(s) and other ingredient(s) may be suitably admixed with the main components, if necessary.

In the case where a graft-copolymer which does not contain any cross-linking agent either in its elastomeric component or in its graft component is used, it is impossible to obtain the shaped articles of desirable superficial properties unless the mixing and kneading of the composition are carried out three or four times including the preliminary shaping, and the repeated mixing and kneading of the composition spoil the thermal stability of the composition.

However, the composition according to the present invention is able to provide the shaped articles of very fine superficial properties after only once or twice of the mixing and kneading thus showing the large merit of the cross-linked components.

The composition according to the present invention is particularly suitable for shape-forming by blow-molding method and profile-extruding method, and gives relatively desirable superficial properties to the shaped articles with favorable appearance and weather-proofness, and accordingly it is suitable for manufacturing bumpers of automobiles, billboards, hoses, sheets, films and so on for use in the open air other than various machine parts in general, and has a broad range of application. In addition, the composition of the present invention shows a remarkably improved coating property.

Further, in case where $C_4$ to $C_{10}$-alkyl acrylate units are selected as rubber like segment, the composition has an excellent in weather-proofness in addition to the above-mentioned technical advantages.

The present invention will be explained more in detail while referring to the non-limitative examples wherein the word "part" means part by weight.

EXAMPLES 1 TO 4

Polyester-block copolymer (I):

A polyester-block copolymer was prepared by copolymerizing 1360 parts of dimethyl terephthalate, 1100 parts of 1,4-butanediol and 1050 parts of poly(tetramethylene oxide) glycol of a molecular weight of about 1000, which showed a crystalline melting point of 205° C. and a reduced viscosity ($\eta_{sp}/c$) of 2.00 (in a solution of concentration of 0.2 g/100 ml in a mixed 6:4 solvent of phenol and tetrachloroethane at 30° C.).

Graft-copolymer (I):

Seventy parts of a cross-linked elastomeric trunk polymer comprising 1.5% by weight of divinylbenzene units, 76% by weight of butadiene units and 22.5% by weight of styrene units in an emulsion system, and in the presence thereof, 14 parts of styrene, 8.5 parts of methyl methacrylate and 0.3 part of divinylbenzene were graft-copolymerized in an emulsion system, and further, 7.5 parts of methyl methacrylate and 0.15 part of divinylbenzene were graft-copolymerized in the same system, the yield of polymerization being nearly 100% of the theory. By heating the slurry obtained by salting out the thus formed polymer latex at 90° C., the slurry was thermally treated, dehydrated, washed with water and dried to obtain powdery graft-copolymer (I).

After mixing the thus obtained graft-copolymer (I) and the above-mentioned polyester-block polymer (I) at several ratios shown in Table 1, the thus obtained composition was two times subjected to extrusion by a monoaxial extruder of 35 mm in cylinder diameter at a resin temperature of 210° C. to be pellets.

These pellets were subjected to shape-forming by (1) extrusion with the same extruder and the same conditions of extruding into a tape of 2 mm in thickness and 20 mm in width, and by (2) extrusion with another monoaxial extruder of 25 mm in cylinder diameter at a resin temperature of 230° C. into a sheet of 0.2 mm in thickness through a T-die. The thus shape-formed articles, the tape and the sheet, were examined by the following method, the results being shown in Table 1 together with the results of the tests carried on the shaped articles in Comparative Examples 1 and 2 shown below.

Methods for determining the properties of the articles:

Superficial hardness: ASTM-D 2240
Tensile specificities: ASTM-D 412
Weather-proofness: Accelerated exposure test in weather-o-meter
Izod impact strength: ASTM-D 256
Melt-index: ASTM-D1238
Coating Property: Japanese Industrial Standard JIS-D-0202

COMPARATIVE EXAMPLE 1

The polyester-block copolymer (I) was shaped at a resin temperature of 210° C. into a tape of 2 mm in thickness and 20 mm in width by using a monoaxial extruder of 35 mm in cylinder diameter, and the same copolymer (I) was shaped at a resin temperature of 230° C. into a sheet of 0.2 mm in thickness using a monoaxial extruder of 25 mm in cylinder diameter and a T-die. The thus shaped articles were tested on their physical properties as in Example 1. The results are also shown in Table 1.

COMPARATIVE EXAMPLE 2

A graft copolymer (II) was prepared by the same manner as in Example 1 for preparing the graft copolymer (I) except for not using the cross-linking agent, divinylbenzene, to be added to the grafting component. The yield of polymerization on each stage was nearly 100%. After combining the thus obtained graft copolymer (II) with the polyester-block copolymer (I) prepared in Example 1, the thus obtained composition (mixture of two polymers) was kneaded and shaped into the articles of the same dimensions as in Comparative Example 1. The test results of the articles are also shown in Table 1.

In the case of shape-forming the polyester-block copolymer alone, since the melt viscosity of the copolymer was low (in other word, its melt index was large), for instance, the drawdown of the parison (a cylindrical body of melt copolymer) during blow-molding was so large that it was difficult to prepare a hollow shaped article with the wall uniform in thickness.

On the contrary, in the polyester-block copolymer composition according to the present invention, the properties concerning the drawdown have been remarkably improved and accordingly, the operation of shape-forming was easily carried out to prepare the shaped articles of high quality. Namely, the superficial appearance of the shaped article made of the composition according to the present invention was favorable while retaining the favorable inherent properties of polyester-block copolymer.

Furthermore, in the case of using the non-crosslinked graft copolymer as in Comparative Example 2, the superficial roughness of the shaped article due to the poor dispersibility of the non-cross-linked graft copolymer was remarkable together with the demerit of a relatively large drawdown.

EXAMPLE 5 AND COMPARATIVE EXAMPLE 3

Effects of mixing and kneading on the superficial properties of the shaped article by extrusion were examined. Namely, the compositions (mixture of graft copolymer and polyester-block copolymer) respectively obtained in Example 3 and Comparative Example 2 were pelletized under the above-mentioned conditions once, twice and three times, and the thus prepared pellets were extruded under the same conditions to examine the superficial properties of the thus shaped articles. The results of examination are shown in Table 2.

TABLE 1

| Item | Unit | Example 1 | Example 2 | Example 3 | Example 4 | Comparative Examples 1 | Comparative Examples 2 |
|---|---|---|---|---|---|---|---|
| Composition | | | | | | | |
| Polyester-block copolymer (I) | part by weight | 80 | 70 | 60 | 40 | 100 | 60 |
| Graft copolymer (I) | | 20 | 30 | 40 | 60 | 0 | 0 |
| Graft copolymer (II) | | 0 | 0 | 0 | 0 | 0 | 40 |
| Physical Property (of the tape) | | | | | | | |
| Superficial hardness | Shore-D | 54 | 54 | 54 | 53 | 54 | 54 |
| Tensile strength | kg/cm$^2$ | 233 | 216 | 204 | 191 | 267 | 221 |
| Stress at 50% elongation | kg/cm$^2$ | 124 | 109 | 103 | 98 | 133 | 107 |
| Izod Impact strength (notched) | kg · cm/cm | NB[1] | NB | NB | NB | NB | NB |
| Melt index (230° C., 2160 g) | g/10 min | 7 | 5 | 2 | 1 | 18 | 12 |
| Appearance, superficial[2] | | 1 | 1 | 1 | 1 | 1 | 4 |
| Fish-eyes of the sheet[3] | number/100 cm$^2$ | 13 | 11 | 10 | 10 | 3 | 51 |
| Coating property[4] | | 1 | 1 | 1 | 1 | 3 | 2 |

Notes:
[1]NB means not broken by the impact.
[2]Appearance, superficial grade:
1: no roughness of surface due to fish-eyes, good in lustre
2: slight roughness of surface, good in lustre
3: a little heavy roughness of surface, a little poor in lustre
4: heavy roughness of surface, poor in lustre
[3]Fish-eye means a protuberance of larger than 50 microns in diameter
[4]Coating property: 1 Excellent 2 good 3 poor 4 bad (Refer to Japanese Industrial Standard for testing material JIS D-0202)

As is seen in Table 2, the composition according to the present invention gave the articles excellent in superficial properties even by the low degree of mixing and kneading (after one time of pelletizing).

TABLE 2

| Item | Number of pelletizing | Unit | Example 3 | Comparative Example 3 |
|---|---|---|---|---|
| Composition | | | | |
| Polyester-block copolymer (I) | | Part by weight | 60 | 60 |
| Graft copolymer (I) | | | 40 | 0 |

TABLE 2-continued

| Item | Number of pelletizing | Unit | Example 3 | Comparative Example 3 |
|---|---|---|---|---|
| Graft copolymer (II) | | | 0 | 40 |
| Superficial property | | | | |
| Appearance of the tape | 1 | | 3 | 4 |
| | 2 | | 1 | 4 |
| | 3 | | 1 | 3 |
| Fish-eye of the sheet | 1 | number/100 cm$^2$ | 23 | 87 |
| | 2 | | 10 | 51 |
| | 3 | | 3 | 60 |
| Thermal stability of the shaped article | 1 | | good | good |
| | 2 | | good | a little good |
| | 3 | | a little good | poor |

EXAMPLES 6 TO 9 AND COMPARATIVE EXAMPLES 4 TO 7

In the same manner as in Examples 1 to 4 except for changing the composition of monomers according to those shown in Table 3, a series of graft copolymers were prepared with the polymer yield of nearly 100%. 30 parts of each of the thus obtained graft copolymers was mixed with 70 parts of polyester-block copolymer (I), and the mixture was extruded two times by using a monoaxial extruder of 35 mm in cylinder diameter under the resin temperature of 210° C. to be pellets. These pellets were shaped into a tape and a sheet under the extruding conditions shown in Examples 1 to 4. The results of examination of the thus prepared shaped articles are shown in Table 3.

TABLE 3

| | Composition of Graft Copolymer (see Note) | | | Melt index of the Composition (See Note) | Physical Properties of Shaped Article | | | | |
|---|---|---|---|---|---|---|---|---|---|
| | Rubber-like | Grafting Component | | | Hardness of Surface | Tensile strength | Stress at 50% elongation | Superficial appearance | |
| Example | component | First stage | Second stage | | Shore-D | kg/cm$^2$ | kg/cm$^2$ | Appearance | Number of fisheyes |
| 6 | BU:ST:DVB 50:15:0.65 | MMA:ST:DVB 12.5:15:0.0919 | MMA:DVB 7.5:0.0375 | 4 | 55 | 236 | 117 | 1 | 11/100 cm$^2$ |

TABLE 3-continued

| | Composition of Graft Copolymer (see Note) | | | Melt index of the Composition (See Note) | Physical Properties of Shaped Article | | | | |
|---|---|---|---|---|---|---|---|---|---|
| | Rubber-like | Grafting Component | | | Hardness of Surface Shore-D | Tensile strength kg/cm² | Stress at 50% elongation kg/cm² | Superficial appearance | |
| Example | component | First stage | Second stage | | | | | Appearance | Number of fisheyes |
| 7 | BU:ST:DVB 50:15:0.4875 | MMA:ST:AN:DVB 17:14.5:3.5:0.175 | — | 4 | 55 | 231 | 113 | 1 | 12 |
| 8 | BU:ST:DVB 50:15:0.65 | MMA:ST:DVB 21:14:0.35 | — | 6 | 55 | 224 | 111 | 1 | 15 |
| 9 | BU:ST:DVB 54:16:1.05 | MMA:ST:DVB 8.5:14:0.3 | MMA:BMA:DVB 4.5:3:0.15 | 5 | 53 | 220 | 114 | 1 | 10 |
| Comparative Example 4 | BU:ST:DVB 50:15:0 | MMA:ST:DVB 12.5:15:0 | MMA:DVB 7.5:0 | 12 | 55 | 239 | 113 | 4 | 65 |
| Comparative Example 5 | BU:ST:DVB 50:15:0 | MMA:ST:DVB 12.5:15:0.0919 | MMA:DVB 7.5:0.0375 | 6 | 55 | 227 | 110 | 3 | 49 |
| Comparative Example 6 | BU:ST:DVB 50:15:0.65 | MMA:ST:DVB 12.5:15:1.375 | MMA:DVB 7.5:0.375 | 6 | 55 | 201 | 115 | 3 | 31 |
| Comparative Example 7 | BU:ST:DVB 26.9:8.1:0.35 | MMA:ST:DVB 39:26:0.65 | — | 5 | 62 | 209 | 120 | 3 | 34 |

Notes:
Composition of Graft Copolymer:
BU means butadiene.
ST means styrene.
DVB means divinylbenzene.
MMA means methyl methacrylate.
BMA means butyl methacrylate.
AN means acrylonitrile.
Melt index of the Composition: Extruded amount (g) per 10 min, at the resin temperature of 230° C. and under a stress of 2160 g.

EXAMPLE 10 AND COMPARATIVE EXAMPLES 8 AND 9

Thirty parts of the graft copolymer (I) prepared in Example 1 and used in Examples 1 to 4 was mixed with 70 parts of a polyester-block copolymer (II) (obtained by mixing and heating 800 parts of polyethylene terephthalate and 200 parts of ε-caprolactone; having a crystalline melting point of 220° C. and a reduced viscosity of 1.83). The mixture was extruded two times at a resin temperature of 230° C. by using a monoaxial extruder of 35 mm in cylinder diameter to be pellets. The pellets were shape-formed into a tape of 2 mm in thickness and 20 mm in width by using the above-mentioned extruder at a resin temperature of 230° C., and also into a sheet of 0.2 mm in thickness by using a monoaxial extruder of 25 mm in cylinder diameter and a T-die at a resin temperature of 230° C. The test results of the thus prepared tapes and sheets are shown in Table 4 together with the composition of the material used.

TABLE 4

| | | Ex-Example | Comparative Example | |
|---|---|---|---|---|
| Item | Unit | 10 | 8 | 9 |
| Composition | | | | |
| Polyester-block copolymer (II) | part | 70 | 70 | 100 |
| Graft copolymer (I) | | 30 | — | — |
| Graft copolymer (II) | | — | 30 | — |
| Physical properties of Tape | | | | |
| Superficial hardness (Shore-D) | | 60 | 60 | 63 |
| Tensile strength | kg/cm² | 267 | 272 | 341 |
| Stress at 50% elongation | kg/cm² | 163 | 165 | 207 |
| Melt index of Composition | g/10 min | 6 | 13 | 15 |
| Superficial appearance | | | | |
| Tape (appearance) | | 1 | 3 | 1 |
| Number of fish-eyes on Sheet | /100 cm² | 4 | 28 | 2 |
| Coating property | | 1 | 2 | 4 |

Note:
Concerning the grades in evaluation of superficial properties, refer to Note in Table 1.

As are seen in Tables 1 to 4, the superficial properties of the articles prepared from the composition according to the present invention are superior to those of the articles prepared from the conventional composition.

EXAMPLES 11 TO 13

Polyester-block copolymer (I):
The polyester-block copolymer (I) used in these Examples was prepared by copolymerizing 1300 parts of dimethyl terephthalate, 1100 parts of 1,4-butanediol and 1050 parts of poly(tetramethylene oxide) glycol of molecular weight of about 1000. It showed a crystalline melting point of 205° C. and a reduced viscosity ($\eta_{sp}/c$) of 2.00 (at a concentration of 0.2 g/100 ml of a 6:4 mixed solvent of phenol and tetrachlorotoluene and at 30° C.).

Graft-copolymer (XI):
A cross-linked trunk polymer consisting of 76% by weight of octyl acrylate units, 23% by weight of butadiene units and 1% by weight of 1,3-butanediol diacrylate was prepared by emulsion copolymerization. In the presence of 65 parts of the trunk polymer thus prepared, 15 parts of styrene, 10 parts of methyl methacrylate and 0.1 part of divinylbenzene were graft-copolymerized in an emulsion system. The rate of polymerization in each stage was nearly 100% of theoretical, and the amount of divinylbenzene units in the grafting component was 0.57% by weight of the total grafting components. The slurry obtained by salting out the thus prepared latex of graft-copolymer was thermally treated by heating the slurry to 90° C., dehydrated, washed with water and dried to be powdery graft-copolymer (XI).

Composition and shape-forming:

Each one of the mixtures of the polyester-block polymer (I) and the graft copolymer (XI) at the mutual weight ratios shown in Table 5 was kneaded at the resin temperature of 220° C. while using a monoaxial extruder of 35 mm in cylinder diameter to be pellets, and the pellets were shape-formed under the above-mentioned conditions into a tape of 2 mm in thickness and 20 mm in width. A part of the same pellets was subjected to extrusion at a resin temperature of 230° C. to be a sheet of 0.2 mm in thickness via a T-die.

The superficial hardness, tensile specificities and superficial roughness of the tape, and the fish-eyes and weather-proofness of the sheet prepared from the mixtures of the two polymers were measured by the following methods and are shown in Table 1 along with the data on the articles prepared in Comparative Examples 10 and 11 shown below.

COMPARATIVE EXAMPLE 10

The polyester-block copolymer (I) used in Examples 11 to 13 was subjected to shape-forming in the same manner as in Example 11 to be a tape and a sheet while admixing nothing with the copolymer (XI).

COMPARATIVE EXAMPLE 11

A non-cross-linked graft copolymer (XII) was prepared in the same manner as in the preparation of cross-linked graft copolymer in Examples 11 to 13 except for not using the cross-linking agent in the elastomeric trunk polymer and in the monomeric mixture used in the graft copolymerization.

After mixing 40 parts of the thus prepared non-cross-linked graft copolymer into 60 parts of the polyester-block copolymer (I), the composition was extruded to be shaped articles, the tape and the sheet.

body of melt copolymer) during blow-molding was so large that it was difficult to prepare a hollow shaped article with the wall uniform in thickness.

On the contrary, in the polyester-block copolymer composition according to the present invention, the properties concerning the drawdown have been remarkably improved and accordingly, the operation of shape-forming was easily carried out to prepare the shaped articles of high quality. Namely, the superficial appearance of the shaped article made of the composition according to the present invention was favorable while retaining the favorable inherent properties of polyester-block copolymer.

Furthermore, in the case of using the non-crosslinked graft copolymer as in Comparative Example 11, the superficial roughness of the shaped article due to the poor dispersibility of the non-cross-linked graft copolymer was remarkable together with the demerit of a relatively large drawdown.

EXAMPLE 14

A polymer latex containing 65 parts of a cross-linked trunk polymer comprising 1% by weight of 1,3-butanediol diacrylate units and 99% by weight of n-butyl acrylate units was prepared by emulsion polymerization and in the presence of the thus prepared trunk polymer, 15 parts of styrene, 20 parts of methyl methacrylate and 0.266 part of ethylene glycol dimethacrylate were graft-copolymerized to the trunk polymer by emulsion polymerization. The yield of polymerization was nearly 100% in every stage. The amount of ethylene glycol dimethacrylate in the monomeric mixture of graft copolymerization was 0.75% by weight.

Forty parts of the thus prepared powdery graft-copolymer (XIII) was admixed with 60 parts of the

TABLE 5

| Item | Unit | Example 11 | Example 12 | Example 13 | Comparative Examples 10 | Comparative Examples 11 |
| --- | --- | --- | --- | --- | --- | --- |
| Composition | | | | | | |
| Polyester-block copolymer (I) | part | 80 | 60 | 50 | 100 | 60 |
| Graft-copolymer (XI) | part | 20 | 40 | 50 | 0 | 0 |
| Graft-copolymer (XII) | part | 0 | 0 | 0 | 0 | 40 |
| Physical properties | | | | | | |
| (Tape) | | | | | | |
| Superficial hardness | Shore-D | 54 | 54 | 53.5 | 54 | 54 |
| Tensile strength | kg/cm$^2$ | 230 | 202 | 190 | 267 | 200 |
| Stress at 50% elongation | kg/cm$^2$ | 125 | 117 | 113 | 133 | 115 |
| Izod Impact Strength (notched) | kg · cm/cm | NB[1] | NB | NB | NB | NB |
| Melt index of Composition | g/10 min | 6 | 3 | 1 | 18 | 10 |
| Superficial properties | | | | | | |
| Appearance of Tape | | 1 | 1 | 1 | 1 | 4 |
| Fish-eyes on Sheet | number/100 cm$^2$ | 19 | 18 | 15 | 4 | 90 |
| Weather-proofness of Sheet | | | | | | |
| Appearance after exposure for 180 hours[2] | | 1 | 1 | 1 | 1 | 1 |
| Coating Property | | 1 | 1 | 1 | 3 | 2 |

Notes:
[1]NB means that the specimen was not broken.
[2]Grade 1: non-discoloration, without any deterioration 2: slightly yellowed with extremely slight cracks 3: yellowed with many cracks 4: strongly yellowed with very much amount of cracks In the case of shape-forming the polyester-block copolymer alone, since the melt viscosity of the copolymer was low (in other word, its melt index was large), for instance, the drawdown of the parison (a cylindrical polyester-block copolymer (I), and the mixture was processed by the same manner as in Example 1 to be shaped articles by extrusion. The test results of the thus obtained shaped articles are shown in Table 6.

TABLE 6

| Physical properties of the Tape | | |
|---|---|---|
| Superficial hardness | Shore-D | 54 |
| Tensile strength | kg/cm² | 210 |
| Stress at 50% elongation | kg/cm² | 120 |
| Izod impact strength (notched) | kg · cm/cm | NB |
| Melt index (230° C., 2160 g) | g/10 min | 2 |
| Processability in extrusion | | favorable |
| Superficial appearance of the Tape | | 1 |
| Fish-eye on the Sheet | number/100 cm² | 17 |
| Weather-proofness | | |
| After exposing for 180 hours | | 1 (see Table 1) |
| Coating property | | 1 |

As is seen in Table 6, in the composition according to the present invention, the processability in extrusion has been improved while retaining the favorable inherent physical properties of the polyester-block copolymer, and the composition gave a favorable superficial appearance to the shaped article together with a favorable weather-proofness.

EXAMPLE 15 AND COMPARATIVE EXAMPLE 12

Sixty parts of block copolymer of polyethylene terephthalate and poly-ε-caprolactone, prepared by heating 800 parts of polyethylene terephthalate and 200 parts of ε-caprolactone at 280° to 290° C. for 30 min., showing a crystalline melting point of 220° C. and a reduced viscosity of 1.63 (II) was mixed with 40 parts of the graft copolymer (XI) in Example 11, and the mixture was subjected to kneading and extruding in the same manner as in Examples 11 to 13 to be shaped articles, tapes and sheets. The test results of the tape and the sheet for Example 15, and those of the tapes and the sheets made of the block copolymer of polyesters (II) in Comparative Example 12 are shown in Table 7.

TABLE 7

| Item | Unit | Example 15 | Comparative Example 12 |
|---|---|---|---|
| Composition | | | |
| Polyester-block copolymer (II) | part | 60 | 100 |
| Graft-copolymer (I) | part | 40 | 0 |
| Physical properties of Tape | | | |
| Superficial hardness | Shore-D | 58 | 63 |
| Tensile strength | kg/cm² | 263 | 341 |
| Stress at 50% elongation | kg/cm² | 143 | 207 |
| Isod impact strength (notched) | kg · cm/cm | NB | NB |
| Melt index of the Composition | g/10 min | 3 | 15 |
| Superficial appearance of Tape | | 1 | 1 |
| Fish-eye on Sheet | number/100 cm² | 14 | 3 |
| Weather-proofness | | | |
| After exposing for 180 hours | | 1 | 1 |
| Coating property | | 1 | 4 |

As is seen in Table 7, the composition according to the present invention is excellent in processability to prepare the shaped articles of favorable in superficial appearance.

EXAMPLE 16

Sixty-five parts by weight of a cross-linked trunk copolymer consisting of 1% by weight of ethylene glycol dimethacrylate, 54% by weight of octyl acrylate, 15% by weight of methyl methacrylate and 30% by weight of butadiene were prepared by emulsion polymerization, and in the presence of the thus prepared emulsion type copolymer, 11 parts by weight of styrene, 5 parts by weight of methyl methacrylate, 4 parts by weight of acrylonitrile and 0.152 part by weight of ethylene glycol dimethacrylate were graft-copolymerized in emulsified state to the above-mentioned cross-linked trunk copolymer, and then also in the presence of the thus graft-copolymer in emulsion state, further, 15 parts by weight of methyl methacrylate, 0.114 part by weight of ethylene glycol dimethacrylate also in emulsified state. The rates of polymerization of the respective stages were nearly 100%. The content of ethylene glycol methacrylate units in the graft-copolymerized portion was 0.75% by weight.

Forty parts by weight of the thus obtained powdery graft-copolymer(XIV) is admixed with 60 parts by weight of polyester block copolymer(I) in the same manner as in Example 11, and the mixture was extruded to be shaped articles. The results of extrusion shaping were shown in Table 8.

TABLE 8

| Physical properties of the extruded and shaped article (Tape) | |
|---|---|
| Superficial hardness | Shore-D of 54 |
| Tensile strength | 201 kg/cm² |
| Stress at 50% elongation | 122 kg/cm² |
| Izod Impact strength (notched) | (NB) kg · cm/cm |
| Melt index (at 230° C., 2160 g) | 3 g/10 min |
| Processability in extrusion | favorable |
| Superficial appearance of the Tape | Grade 1 |
| Fish-eye on the Sheet (extruded) | 15 number/100 cm² |
| Weather-proofness | |
| After exposing for 180 hours | Grade 1 |
| Coating property | Grade 1 |

What is claimed is:
1. A polyester-block copolymer composition which comprises 95% to 20% by weight of a polyester-block copolymer obtained by the copolymerization of 95% to 20% by weight of hard polyester segments having a melting point higher than 150° C., and 5% to 80% by weight of polymer segments having a melting point of less than 80° C. and a molecular weight of 400 to 20,000; and

5% to 80% by weight of at least one of a graft-copolymer formed by graft copolymerization of:
50 to 25 parts by weight of a monomeric mixture comprised of 90% to 10% by weight of styrene and 10% to 90% by weight of methyl methacrylate, and 0.01% to 3% by weight of a cross-linking agent, with
50 to 75 parts by weight of an elastomeric trunk polymer containing not less than 50% by weight of rubber like segments selected from the group consisting of butadiene units and C₄ to C₄-alkyl acrylate units, and 3.0% to 0.01% by weight of a cross-linking agent.

2. A polyester-block copolymer composition according to claim 1, wherein said polyester-block copolymer composition comprises 5 to 60% by weight of said graft-copolymer and 95 to 40% by weight of said polyester-block copolymer.

3. A polyester-block copolymer composition according to claim 2, wherein said hard polyester is a polycondensate of terephthalic acid or methyl ester thereof and 1,4-butanediol.

4. A polyester-block copolymer composition according to claim 2, wherein said hard polyester is a polycondensate of terephthalic acid and isophthalic acid or methyl ester thereof and 1,4-butanediol.

5. A polyester-block copolymer composition according to claim 2, wherein said polymer segment having the melting point of less than 80° C. comprises poly(tetramethylene oxide) glycol or poly-ε-caprolactone.

6. A polyester-block copolymer composition according to claim 1, wherein said elastomeric trunk polymer is a copolymer of butadiene and styrene, containing not less than 50% by weight of butadiene units and 0.01 to 3.0% by weight of a cross-linking agent.

7. A polyester-block copolymer composition according to claim 1, wherein said elastomeric trunk polymer is a copolymer of butyl acrylate and butadiene, containing not less than 50% by weight of alkyl-acrylate units and 0.01 to 3.0% by weight of a cross-linking agent.

8. A polyester-block copolymer composition according to claim 1, wherein said elastomeric trunk polymer is a polymer of butyl acrylate or octyl acrylate, containing not less than 50% by weight of alkyl-acrylate units and 0.01 to 3.0% by weight of a cross-linking agent.

9. A polyester-block copolymer composition according to claim 1, wherein said monomeric mixture predominantly composed of styrene and methyl methacrylate contains a small amount of butyl methacrylate and a cross-linking agent.

10. A polyester-block copolymer composition according to claim 1, wherein said monomeric mixture predominantly composed of styrene and methyl methacrylate contains a small amount of acrylonitrile and a cross-linking agent.

11. A polyester-block copolymer composition according to claim 1, wherein said cross-linking agent is divinylbenzene or ethylene glycol dimethacrylate or 1,3-butanediol diacrylate.

12. The polyester block copolymer composition according to claim 1 wherein said polymer segments are polyesters.

* * * * *